United States Patent
Honda et al.

(10) Patent No.: US 7,439,905 B2
(45) Date of Patent: Oct. 21, 2008

(54) RADAR APPARATUS

(75) Inventors: Kanako Honda, Kobe (JP); Osamu Isaji, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 272 days.

(21) Appl. No.: 11/208,857

(22) Filed: Aug. 23, 2005

(65) Prior Publication Data

US 2006/0055593 A1    Mar. 16, 2006

(30) Foreign Application Priority Data

Sep. 13, 2004    (JP) .............................. 2004-265561

(51) Int. Cl.
*G01S 13/40* (2006.01)

(52) U.S. Cl. ...................... 342/174; 342/196

(58) Field of Classification Search ................... 342/174
See application file for complete search history.

(56) References Cited

U.S. PATENT DOCUMENTS

| | | | | |
|---|---|---|---|---|
| 3,383,678 A | * | 5/1968 | Palmer | 342/28 |
| 4,622,556 A | * | 11/1986 | Bryant et al. | 342/174 |
| 4,884,440 A | * | 12/1989 | Berthel | 73/170.23 |
| 5,187,486 A | * | 2/1993 | Kolzer | 342/360 |
| 5,315,185 A | * | 5/1994 | Usimaru | 327/63 |
| 5,625,362 A | | 4/1997 | Richardson | |
| 5,677,695 A | * | 10/1997 | Suzuki et al. | 342/109 |
| 5,955,991 A | | 9/1999 | Kawakubo | |
| 6,317,076 B1 | | 11/2001 | Ameen et al. | |
| 6,445,339 B1 | | 9/2002 | Yamada | |
| 6,486,823 B1 | * | 11/2002 | Benson et al. | 342/14 |
| 2004/0174291 A1 | | 9/2004 | Isaji | |

FOREIGN PATENT DOCUMENTS

| | | |
|---|---|---|
| EP | 1 262 793 A1 | 12/2002 |
| JP | A 10-253750 | 9/1998 |
| JP | A 11-160423 | 6/1999 |
| JP | A 2000-111640 | 4/2000 |
| JP | A 2002-090447 | 3/2002 |
| JP | A 2003-232847 | 8/2003 |
| JP | A 2003-315445 | 11/2003 |

OTHER PUBLICATIONS

Flikkema et al; "Vehicle Collision Warning and Avoidance System Using Real-Time FFT"; Vehicular Technology Conference, 1996; vol. 3; Apr. 28, 1996; pp. 1820-1824; XP-010162707.

* cited by examiner

*Primary Examiner*—Thomas H. Tarcza
*Assistant Examiner*—Matthew M Barker
(74) *Attorney, Agent, or Firm*—Oliff & Berridge, PLC

(57) ABSTRACT

In a radar apparatus constructed to perform switching between a plurality of receiving antennas by using a switch, the effect of noise induced by the antenna switching is eliminated. A situation where there is no echo signal from a target is created, for example, by turning off a transmitter amplifier, and the Fourier transformed result obtained at this time is taken as a correction value and stored in a memory. During radar operation, the effect of the noise induced by the antenna switching can be eliminated by subtracting the correction value from the Fourier transformed result.

8 Claims, 6 Drawing Sheets

RADAR APPARATUS

BACKGROUND OF THE INVENTION

1. Field of the Invention

The present invention relates to the elimination of noise induced by antenna switching in a radar apparatus constructed to perform switching between a plurality of receiving antennas by using a switch.

2. Description of the Related Art

Such techniques as DBF (Digital Beam Forming) and phase monopulse that use a plurality of receiving antennas are known for determining target bearing. Further, in Japanese Unexamined Patent Publication No. 11-160423, for example, it is described that the number of expensive high-frequency components can be reduced by employing a configuration for sequentially selecting a plurality of receiving antennas by switching from one antenna to another.

In a radar apparatus having a configuration, such as that shown in FIG. 1, in which a plurality of receiving antennas are sequentially selected by switching from one antenna to another, signal power leaks from the transmitter side to the receiver side of the high-frequency section in the form of a DC current and, as the DC current value differs from one channel to another, a rectangular wave such as shown in part (A) of FIG. 2 is generated at the output of a mixer 7. This rectangular wave causes transient response noise, such as shown in part (B) of FIG. 2, due to the characteristics of a filter at a subsequent stage. When the filtered signal shown in FIG. 2(B) is Fourier transformed, a noise peak appears at the frequency position corresponding to its frequency component; if this noise peak is close to the peak frequency occurring due to an echo signal from a target, there arises the problem that it becomes difficult to analyze the echo signal. For example, if the noise frequency appears in the vicinity of the peak frequency of an echo signal from a target located at a short range, it becomes difficult to discriminate the peak occurring due to the short-range target, and the short-range detection performance thus degrades.

SUMMARY OF THE INVENTION

Accordingly, it is an object of the present invention to eliminate the noise induced by antenna switching in a radar apparatus constructed to perform switching between a plurality of receiving antennas by using a switch.

According to the present invention, there is provided a radar apparatus comprising: a switch for selecting one of the signals received by a plurality of receiving antennas by sequentially switching from one antenna to another; a mixer for producing a beat signal by mixing a portion of a transmitter signal with the received signal selected by the switch; a Fourier transforming means for Fourier transforming the output signal of the mixer; a correction value storing means for storing the Fourier transformed result provided from the Fourier transforming means when there is no echo signal from a target, as a correction value for canceling any effect caused when the DC level of the mixer fluctuates due to the switching of the switch; and a correcting means for correcting the Fourier transformed result from the Fourier transforming means by the correction value stored in the storing means.

DESCRIPTION OF THE PREFERRED EMBODIMENTS

Figure 3:
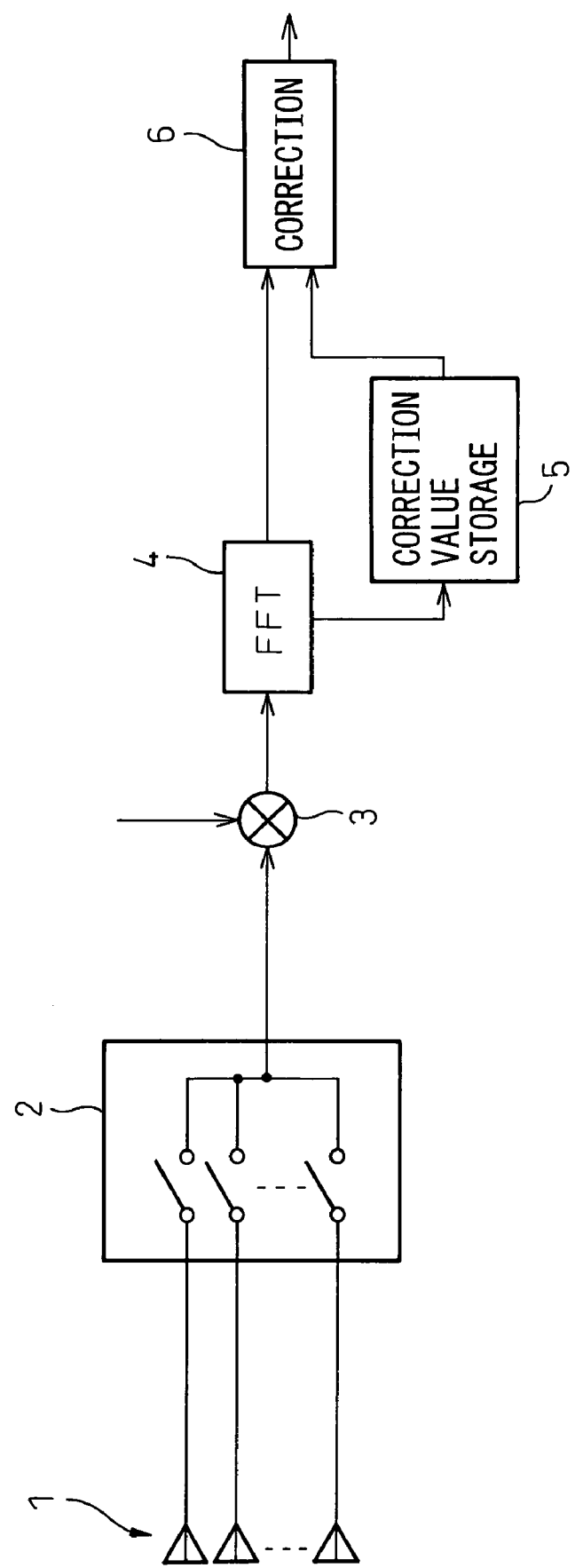
FIG. 3 is a simplified block diagram of a radar apparatus according to the present invention.

FIG. 3 shows a simplified block diagram of a radar apparatus according to the present invention. As shown in FIG. 3, the radar apparatus of the present invention comprises: a switch 2 for selecting one of signals received by a plurality of receiving antennas 1 by sequentially switching from one antenna to another; a mixer 3 for producing a beat signal by mixing a portion of a transmitter signal with the received signal selected by the switch 2; a Fourier transforming means 4 for Fourier transforming the output signal of the mixer 3; a correction value storing means 5 for storing the Fourier transformed result provided from the Fourier transforming means 4 when there is no echo signal from a target, as a correction value for canceling any effect caused when the DC level of the mixer 3 fluctuates due to the switching of the switch 2; and a correcting means 6 for correcting the Fourier transformed result from the Fourier transforming means 4 by the correction value stored in the storing means 5.

Figure 4:
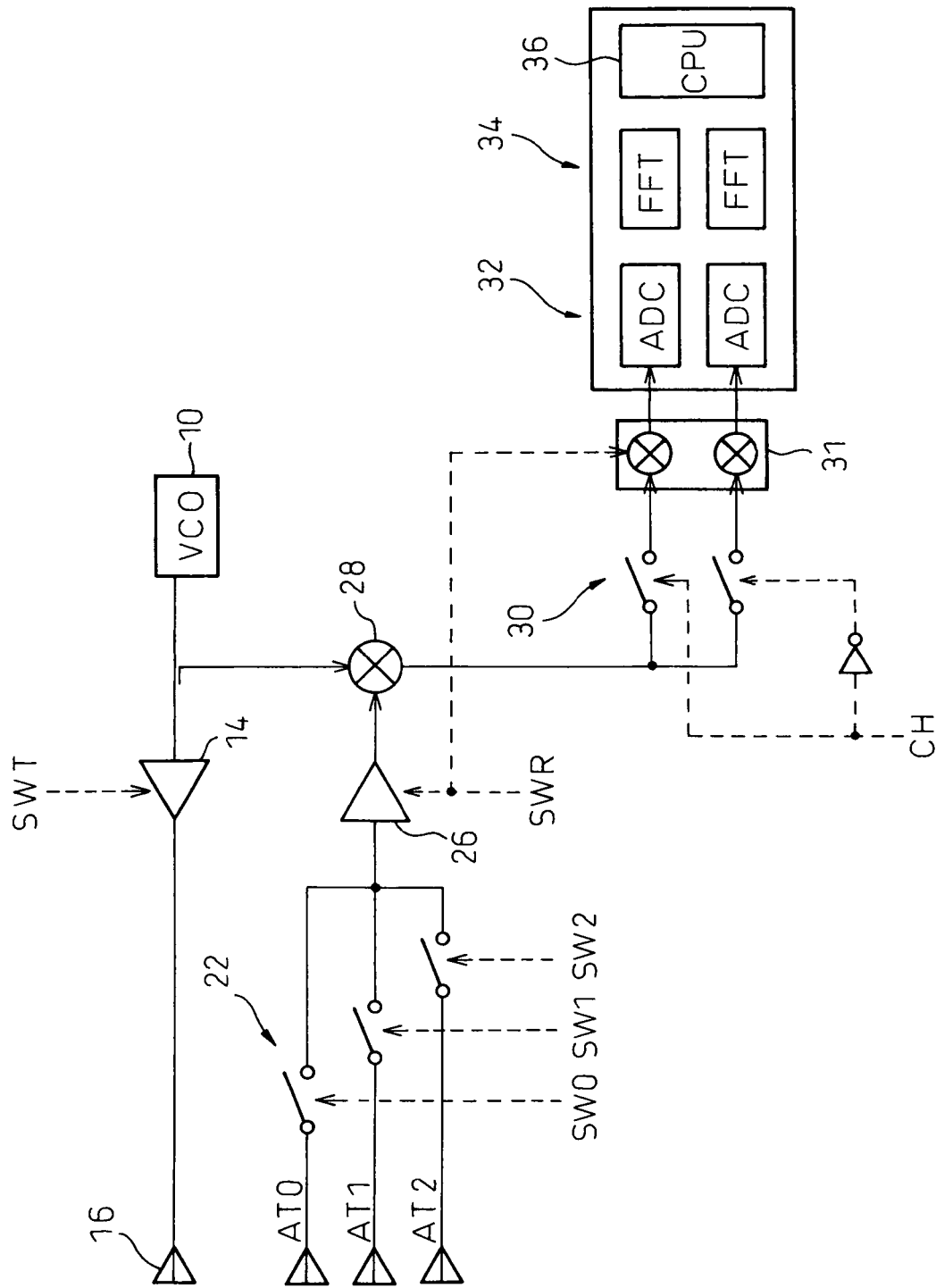
FIG. 4 is a diagram showing the configuration of a first example of an automotive FM-CW radar apparatus to which the present invention is applied.

FIG. 4 is a block diagram showing the configuration of a first example of an automotive FM-CW radar apparatus as one example of the radar apparatus to which the present invention is applied. In FIG. 4, a transmitter signal frequency-modulated by a triangular wave is output from a voltage-controlled oscillator (VCO) 10, is amplified by a transmitter amplifier 14 and is transmitted out from a transmitting antenna 16. Of the three antennas AT0, AT1, and AT2, an antenna selected by a switch 22 is used for reception.

The signal received by each antenna is selected by the switch 22 and supplied to a receiver amplifier 26 where the signal is amplified; the amplified signal is mixed in a mixer 28 with a portion of the transmitted wave to produce a beat signal. The beat signal produced in the mixer 28 is supplied via a switch 30 to a selected one of two processing systems shown one above the other in the figure; then, the signal is converted by an A/D converter 32 into a digital signal, which is fast Fourier transformed (34) and input to a CPU 36.

Figure 5:
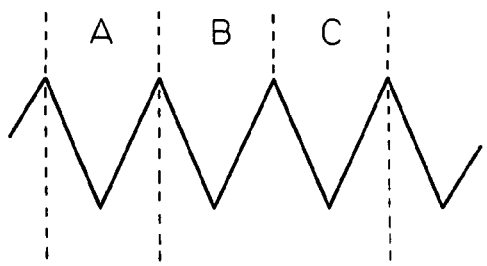
FIG. 5 is a waveform diagram showing a wave modulated by a triangular wave.
Figure 6:
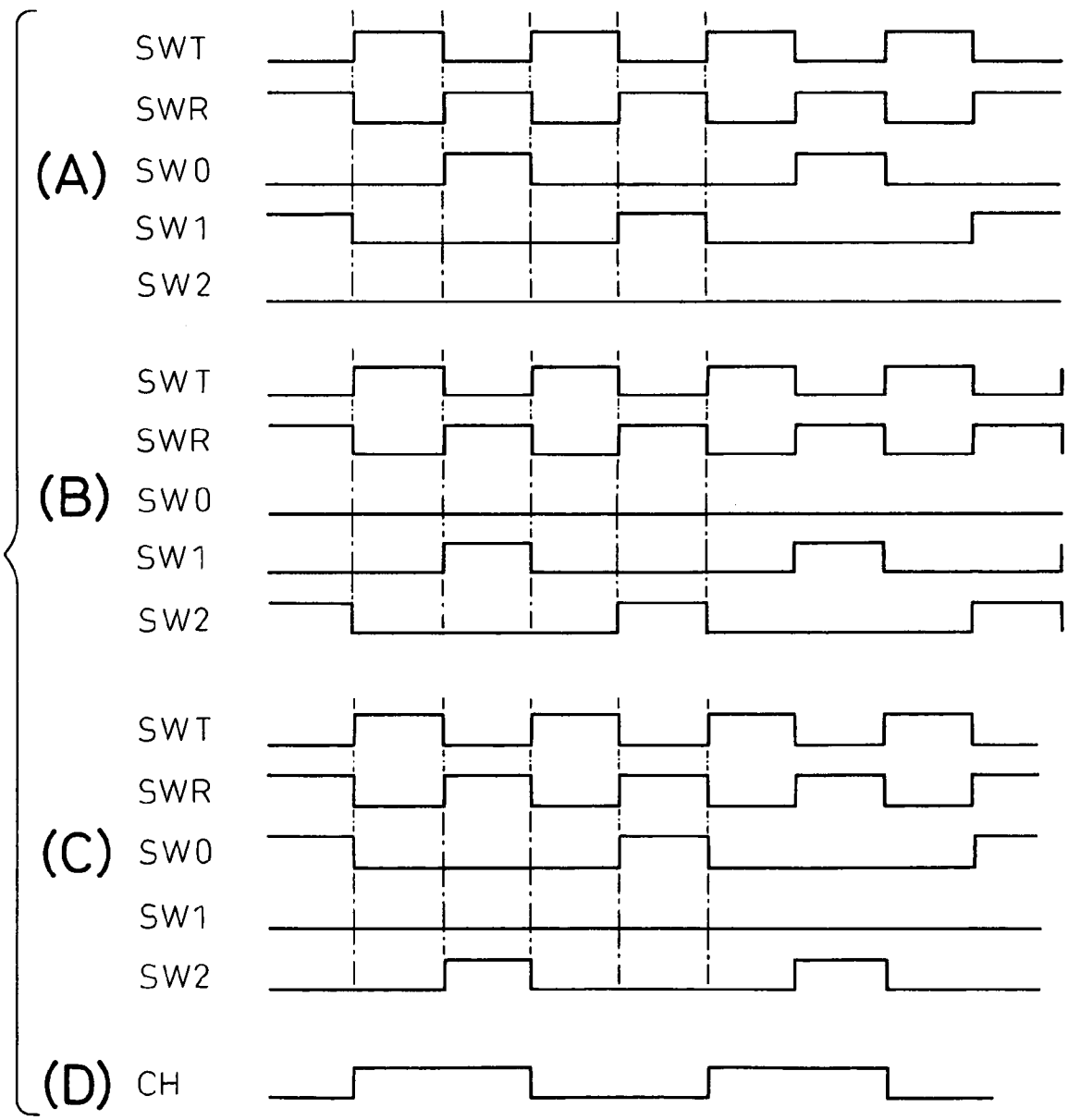
FIG. 6 is a waveform diagram showing the waveforms of various control signals in FIG. 1.

FIG. 5 shows the waveform of the triangular wave applied to the voltage-controlled oscillator 10 in FIG. 4, and parts (A) to (C) of FIG. 6 respectively show the waveforms of the control signals SWT, SWR, SW0, SW1, and SW2 input during the periods indicated by A to C in FIG. 5. In part (D) of FIG. 6, the waveform of a control signal CH applied to the switch 30 is shown in the same time scale and the same timing as those in parts (A) to (C). The time scale of the horizontal axis in FIG. 5 is greatly compressed compared with that in FIG. 6.

In the first cycle of the triangular wave shown in FIG. 5, that is, in the period A, a sequence of operations consisting of transmission, reception by AT0, transmission, and reception by AT1, in this order, is repeatedly performed as can be seen in FIG. 6(A). Then, as can be seen from FIG. 6(D), the beat signal produced from the signal received by AT0 is supplied via the switch 30 in FIG. 4 to the processing system in the upper part in the figure, while the beat signal produced from the signal received by AT1 is supplied to the processing system in the lower part in the figure, and the beat signals are thus processed in parallel. That is, in the period A, data concerning the beat signals respectively produced from the signals received by the receiving antennas AT0 and AT1 during the rising and falling portions of the triangular wave is collected. The frequencies of the peaks appearing in the Fourier transformed result are used to compute the distance and the relative velocity of the target, while the phases of the peaks are used to compute the phase monopulse implemented by the antennas AT0 and AT1.

In the second cycle of the triangular wave shown in FIG. 5, that is, in the period B, a sequence of operations consisting of transmission, reception by AT1, transmission, and reception by AT2, in this order, is repeatedly performed as can be seen in FIG. 6(B). Then, as can be seen from FIG. 6(D), the beat signal produced from the signal received by AT1 is supplied via the switch 30 in FIG. 4 to the processing system in the upper part in the figure, while the beat signal produced from the signal received by AT2 is supplied to the processing system in the lower part in the figure, and the beat signals are thus processed in parallel. That is, in the period B, data concerning the beat signals respectively produced from the signals received by the receiving antennas AT1 and AT2 during the rising and falling portions of the triangular wave is collected. The frequencies of the peaks appearing in the Fourier transformed result are used to compute the distance and the relative velocity of the target, while the phases of the peaks are used to compute the phase monopulse implemented by the antennas AT1 and AT2.

In the third cycle of the triangular wave shown in FIG. 5, that is, in the period C, a sequence of operations consisting of transmission, reception by AT2, transmission, and reception by AT0, in this order, is repeatedly performed as can be seen in FIG. 6(C). Then, as can be seen from FIG. 6(D), the beat signal produced from the signal received by AT2 is supplied via the switch 30 in FIG. 4 to the processing system in the upper part in the figure, while the beat signal produced from the signal received by AT0 is supplied to the processing system in the lower part in the figure, and the beat signals are thus processed in parallel. That is, in the period C, data concerning the beat signals respectively produced from the signals received by the receiving antennas AT2 and AT0 during the rising and falling portions of the triangular wave is collected. The frequencies of the peaks appearing in the Fourier transformed result are used to compute the distance and the relative velocity of the target, while the phases of the peaks are used to compute the phase monopulse implemented by the antennas AT2 and AT0.

Figure 7:
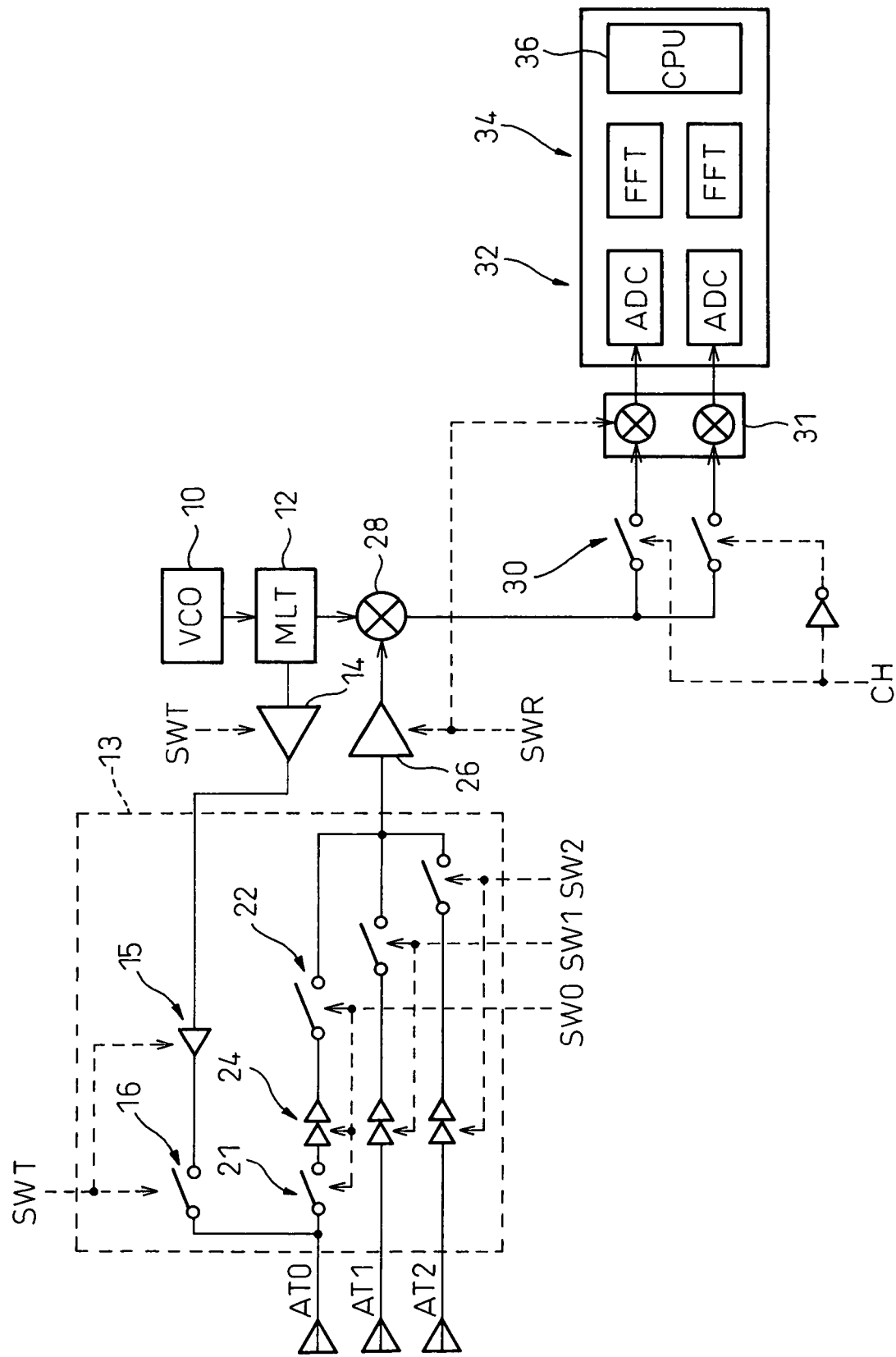
FIG. 7 is a diagram showing a second example of the FM-CW radar apparatus.

FIG. 7 is a block diagram showing the configuration of a second example of the automotive FM-CW radar apparatus as one example of the radar apparatus to which the present invention is applied. In FIG. 7, the transmitter signal frequency-modulated by the triangular wave, output from the voltage-controlled oscillator (VCO) 10, is supplied to a multiplier 12 where the signal is multiplied to produce a millimeter-wave signal, which is then amplified by the transmitter amplifier 14 and fed to an antenna selecting switch 13; in the antenna selecting switch 13, the signal is passed via an amplifier 15 and a switch 16 and transmitted out from the antenna AT0. In the radar apparatus shown in FIG. 7, of the three antennas AT0, AT1, and AT2, only the antenna AT0 is used for transmission, and one of the three antennas AT0, AT1, and AT2 that is selected by the switch 22 is used for reception. A switch 21 for preventing the transmitter signal from leaking into the receiver side is provided between the antenna AT0 and an amplifier 24. If some other means is provided that can prevent the leakage into the receiver side, the switches 16 and 21 need not be provided.

The signal received by each antenna is amplified by the amplifier 24 and supplied via the switch 22 to the receiver amplifier 26 where the signal is amplified, and the amplified signal is mixed in the mixer 28 with a portion of the transmitted wave to produce a beat signal. The processing thereafter is the same as that of the first example described with reference to FIG. 4, and the signals applied to the respective switches are the same as those shown in FIG. 6.

Figure 8:
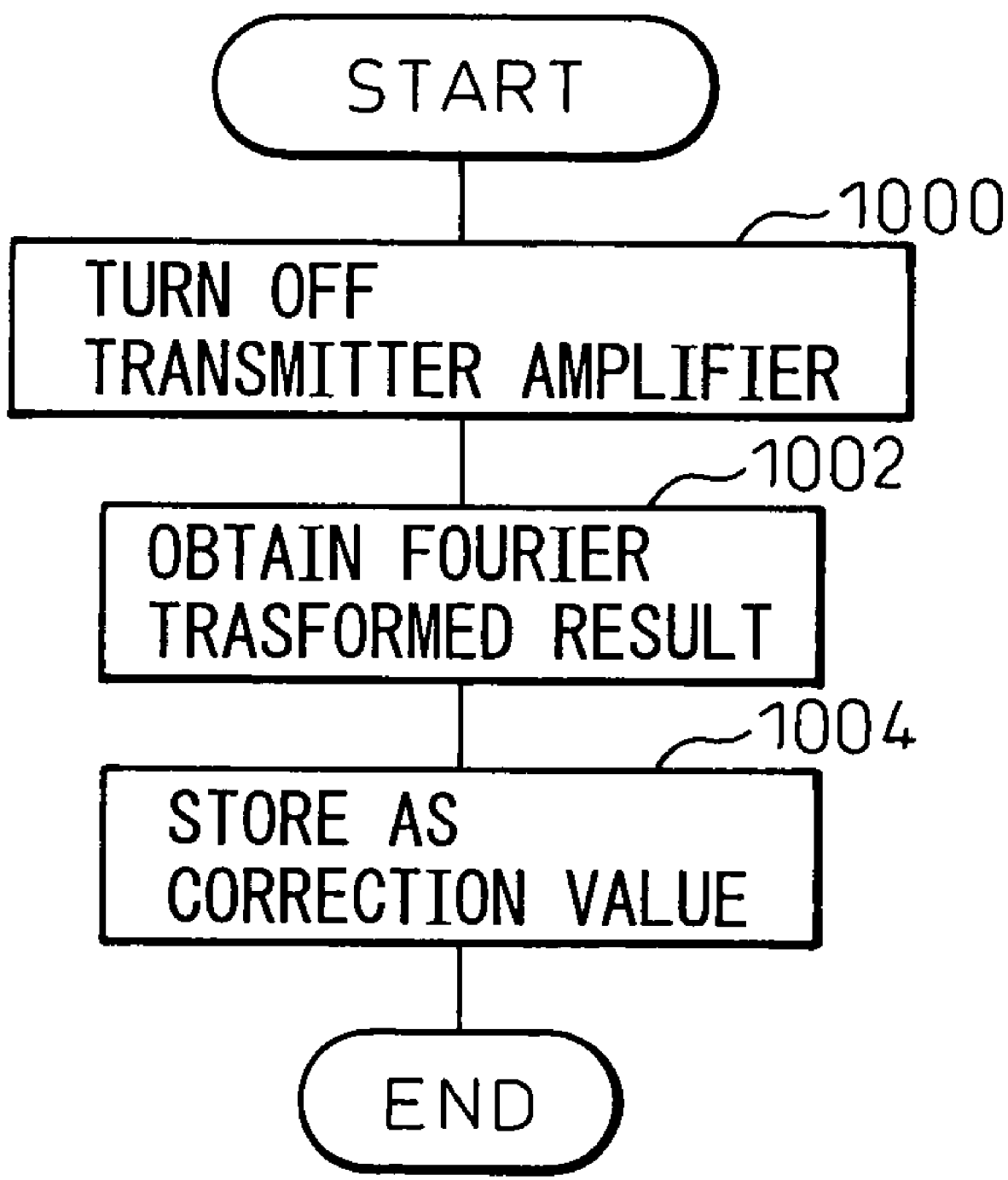
FIG. 8 is a flowchart showing one example of a correction value storing process according to the present invention.

FIG. 8 is a flowchart showing one example of a correction value storing process according to the present invention. In FIG. 8, first, the transmitter amplifier 14 is turned off so that a peak due to an echo signal from a target will not appear in the Fourier transformed result (step 1000); in other respects, the same processing as earlier described is performed to obtain the Fourier transformed result (step 1002) and store it as the correction value in the memory (step 1004). During radar operation, the effect of the noise induced by the antenna switching can be eliminated by subtracting the correction value from the Fourier transformed result. As the antenna switching sequence is different for each of the periods A, B, and C, as shown in FIGS. 5 and 6, the resulting noise is also different. Therefore, the correction value appropriate to each period is stored.

This process is performed, for example, during product inspection prior to the shipment of the product, and the correction value is stored in a nonvolatile memory. This process can also be performed at predetermined intervals of time during radar operation in order to accommodate temperature variations or to correct for variations of the parts over time. In this case, the correction value is stored in a RAM.

Instead of turning off the transmitter amplifier 14, a situation equivalent to a no-target situation may be created by covering the antenna with a radiowave absorber.

The correction value is stored for each of the real and imaginary components of the Fourier transformed result, and computation for correction is performed on each of the real and imaginary components. That is, when the real component before correction, as a function of frequency f, is denoted by $Re(f)$, and the correction value for the real component by $Re_N(f)$, then for each frequency f the real component after correction, $Re_t(f)$, is calculated from the equation $$Re_t(f)=Re(f)-Re_N(f)$$

Likewise, for each frequency f the imaginary component after correction is calculated from the equation $$Im_t(f)=Im(f)-Im_N(f)$$

In cases where bearing detection is performed not by using phase information but by mechanical scanning, the storing of the correction value and the computation for correction may be performed on the power after computing the power (absolute value).

Further, instead of performing the storing of the correction value and the computation for correction of the Fourier transformed result, the storing of the correction value and the computation for correction may be performed on the output value of the A/D converter before the Fourier transform.

Figure 1:
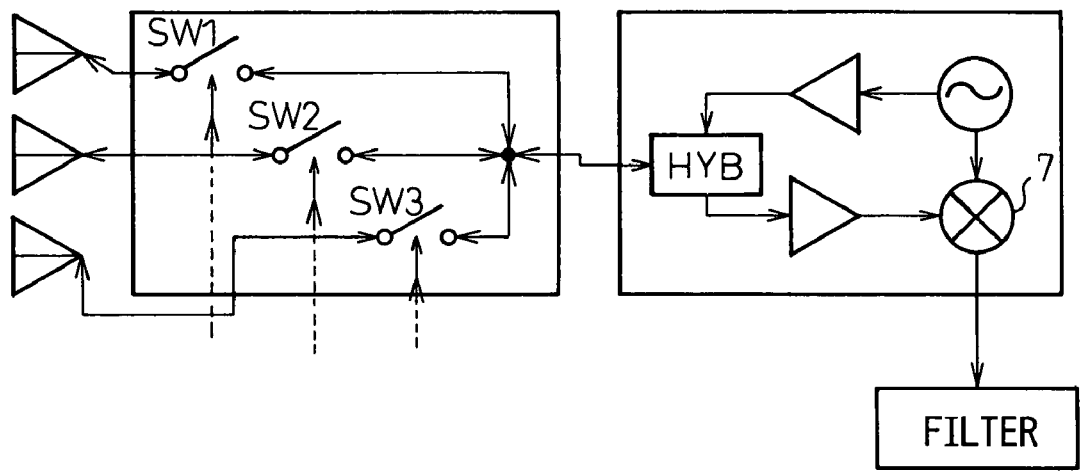
FIG. 1 is a diagram showing the configuration of a radar apparatus that performs antenna switching.
Figure 2:
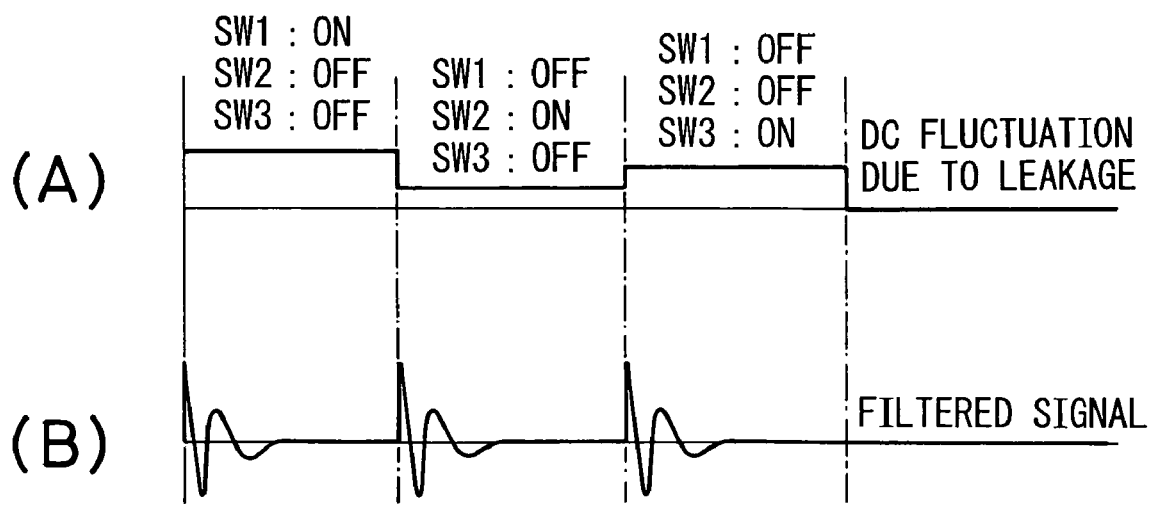
FIG. 2 is a diagram for explaining noise occurring due to antenna switching.

In that case, however, as the noise in the time domain before the Fourier transform, such as shown in part (B) of FIG. 2, is often not stable on the time axis, it is difficult to perform a proper correction. On the other hand, the noise in the frequency domain after the Fourier transform is stable on the time axis, so that a proper correction can be performed.

In the case of the FM-CW radar, the above correction value contains not only the noise due to the antenna switching but also FM-AM conversion noise if it does exist. Therefore, if the FM modulation by the triangular wave is stopped, while also creating the no-target situation, only the noise due to the antenna switching is detected.

The invention claimed is:

1. A radar apparatus comprising:
   a switch for selecting one of signals received by a plurality of receiving antennas by sequentially switching from one antenna to another;
   a mixer for producing a beat signal by mixing a portion of a transmitter signal with the received signal selected by said switch;
   a Fourier transforming device that Fourier transforms the output signal of said mixer;
   a correction value storing device that stores the Fourier transformed result provided from said Fourier transforming device, only when there is no echo signal from a target, as a correction value for canceling any effect caused when a DC level of said mixer fluctuates due to the switching of said switch; and
   a correcting device that corrects said Fourier transformed result from said Fourier transforming device by said correction value stored in said correction value storing device.

2. A radar apparatus according to claim 1, further comprising a transmitter amplifier for amplifying said transmitter signal, wherein said correction value storing device stores, as said correction value, the Fourier transformed result obtained when said transmitter amplifier is turned off.

3. A radar apparatus according to claim 1, wherein said correction value storing device stores, as said correction value, the Fourier transformed result obtained when there is no target.

4. A radar apparatus according to claim 2, wherein said correction value storing device periodically updates said correction value during radar operation by turning off said transmitter amplifier.

5. A radar apparatus according to claim 1, wherein said correction value storing device stores said correction value for each of real and imaginary components of said Fourier transformed result, and
   said correcting device performs said correction on each of the real and imaginary components of said Fourier transformed result.

6. A radar apparatus according to claim 1, wherein said correction value storing device stores said correction value for a power of said Fourier transformed result, and
   said correcting device performs said correction on the power of said Fourier transformed result.

7. A radar apparatus according to claim 1, wherein said transmitter signal is a signal frequency-modulated by a triangular wave, and said correction value storing device stores, as said correction value, the Fourier transformed result obtained when said frequency modulation is stopped.

8. A radar apparatus according to claim 3, wherein said correction value storing device collects and stores said correction value before product shipment.

* * * * *